United States Patent [19]

Guerbet

[11] 4,043,571
[45] Aug. 23, 1977

[54] SUSPENSION SYSTEM

[76] Inventor: Francois Guerbet, 6 rue de Vergennes, Versailles, France, 78000

[21] Appl. No.: 675,599

[22] Filed: Apr. 9, 1976

[30] Foreign Application Priority Data

Apr. 15, 1975 France .................................. 75.11754

[51] Int. Cl.² ............................................ B60G 11/60
[52] U.S. Cl. ................................ 280/716; 267/57.1 A
[58] Field of Search ............... 280/716, 717, 690, 695; 267/57.1 R, 57.1 A

[56] References Cited

U.S. PATENT DOCUMENTS

| 2,715,022 | 8/1955 | Krotz | 267/57.1 R |
| 3,353,840 | 11/1967 | Love | 280/716 |
| 3,868,129 | 2/1975 | Grosseau | 267/57.1 R |
| RE. 28,259 | 12/1974 | Henschen | 280/716 |

FOREIGN PATENT DOCUMENTS 646,017  11/1950  United Kingdom  ........... 267/57.1 R Primary Examiner—Joseph F. Peters, Jr.
Assistant Examiner—R. Schrecengost
Attorney, Agent, or Firm—Johnston, Keil, Thompson & Shurtleff

[57] ABSTRACT

A suspension system for connecting an axle support for a wheel of a vehicle to the chassis of the vehicle is provided which comprises a hollow cross frame containing a bar maintained in said frame by four compressively distorted rubber blocks within the hollow cross frame, a support for an axle to carry a wheel, said support being fixed to said hollow cross frame, at least one connecting arm connecting said hollow cross frame to the chassis of the vehicle through an elastic block, at least one connecting arm connecting said bar to the chassis of the vehicle via a tubular bar which is pivotally mounted on said frame, said hollow cross frame being disposed at an intermediate height between the height of the elastic bar and the height of said tubular bar, thereby to form, in projection on a vertical plane, a deformable trangulated suspension system.

5 Claims, 3 Drawing Figures

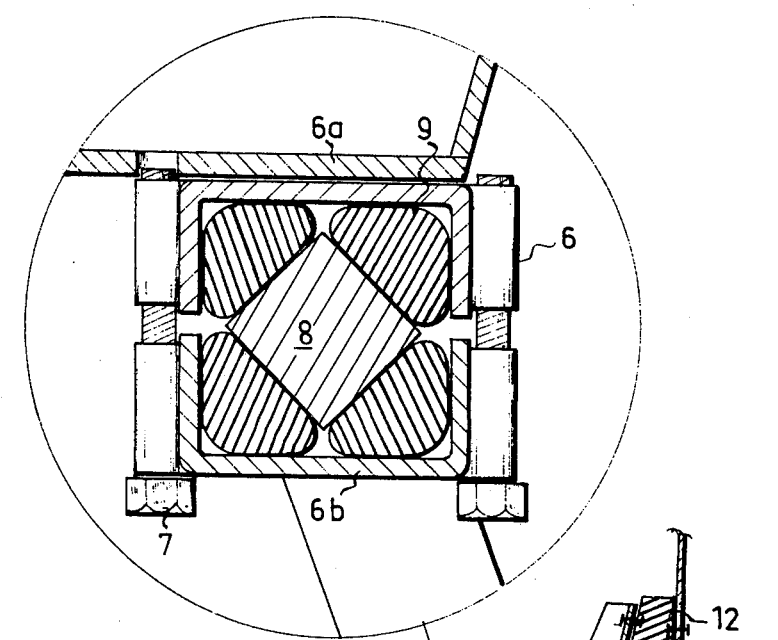
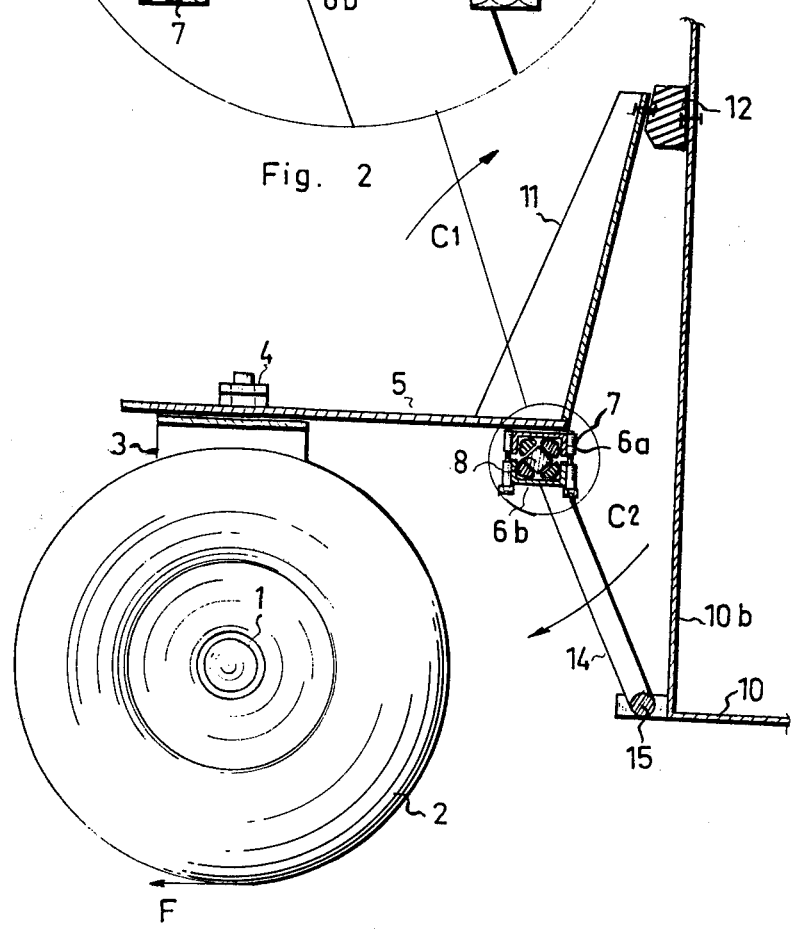

SUSPENSION SYSTEM

The present invention relates to a suspension system for resiliently connecting a vehicle axle carried by an axle support to the chassis of the vehicle. Such a system may be used, for example, for the suspension of an axle on which is mounted a single wheel such as the front axle of an automotive vehicle having a single guiding wheel, or for the suspension of an axle on which two wheels are mounted, e.g., an axle in two parts, the two half axles of which each carry a wheel on their free end.

Suspension systems which are generally known allow an approximately vertical play in a single direction. Such vertical freedom of motion is sufficient when the obstacles or roughness of the road encountered by the wheel or wheels are not very significant or not approached frontally. In other situations shocks occur which are not completely dampened and in addition to the poor ride, high stresses may at times develop on the body and chassis of the vehicle.

It is well known that present suspension systems, in the absence of correcting devices, do not suitably counterbalance the rearward torque which develops during the starting of a vehicle or the forward thrust of the vehicle which occurs during the braking action.

One of the objects of the present invention is to provide a suspension system which allows for play of the wheels (or of one wheel) in all directions of the vertical plane which contains said wheels.

Another object of the invention si to provide a suspension system which counterbalances rearward thrust during starting.

Another object of the invention is to provide a suspension system which is simple in structure and in which the degree of resiliency can easily be adjusted.

Still a further object of the invention is to provide an anti-vibration suspension system which completely insulates the movable parts with respect to the chassis and to the body, the system being capable of supporting not only a rotatable wheel, but also the driving members (e.g., an electric motor and its transmission).

In accordance with the invention, a suspension system is provided for resiliently connecting an axle support of a wheel of a vehicle to the chassis which comprises a hollow cross frame containing a bar maintained in said cross frame by means of elastic fittings, said frame being fixed to a support for the axle of the wheel and being connected by at least one connecting arm which is secured to the chassis of the vehicle through an elastic block and said bar being connected by at least one connecting arm to the chassis through articulation means, said cross frame being disposed at an intermediate height between that of the elastic block and that of the articulation means, thereby forming in projection on a vertical plane a triangulated deformable system.

The invention and its advantages will be better understood from the following description in conjunction with the accompanying drawings, which illustrate in a non-limiting manner, one embodiment of the invention.

In the drawings:

FIG. 2 is a vertical sectional view of said system taken centrally through FIG. 1, and FIG. 3 is an enlargement of a portion of the system shown in FIG. 2.

Figure 1:
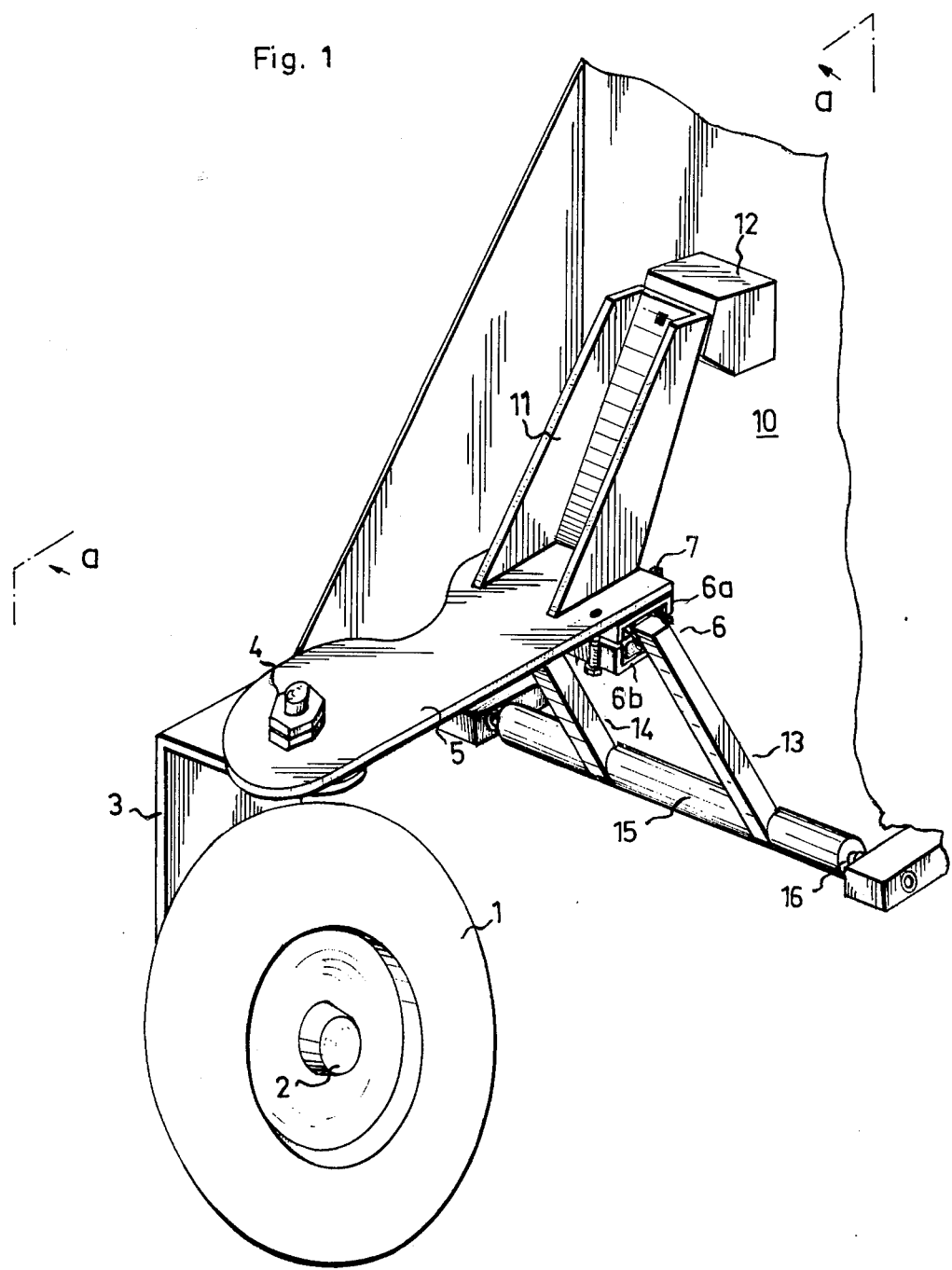
FIG. 1 is a perspective view of a suspension system provided in accordance with the invention.

The suspension system illustrated in the drawings comprises a front rotatable wheel of an automotive vehicle, in this case propelled by electric energy, said vehicle having a single front wheel 1, which is both a driving and a guiding wheel. Wheel 1 is mounted on an axle 2 carried by a member 3 articulated by means of a shaft 4 on a support 5 carried by the suspension system. Thus, the wheel may be made to pivot, by means of a steering system (not shown) around a vertical shaft, in order to steer the vehicle.

In this embodiment, the electric motor unit and its transmission (not shown) are supported by member 3, so that the suspension system to which support 5 is connected serves at the same time as a resilient connection for the motor complex and as a suspension for the rotatable wheel 1. By separating those elements with respect to the chassis, the suspension resists transmission of vibrations from the motor as well as of those from the rotatable wheel.

The suspension system includes a hollow frame 6 in this embodiment, made of half-shells 6a and 6b, placed face to face and connected by tightening means. The half-shells may very simply consist of metal profiles the section of which is U-shaped, and the tightening means by tubes such as 7 welded face to face on the profiles and inside which there are tightened bolts, the tubes welded on a profile being threaded at the end. Thus, it is possible to adjust the spacing of the half-shells 6a and 6b, a situation which makes it possible to adjust the degree of resiliency of the suspension, as hereinafter described.

In the embodiment illustrated, axle 2 which carries the wheel is connected to the frame 6 by means of support 5 welded on the upper half-shell 6a. Inside frame 6, there is disposed a bar 8 the section of which is approximately square as shown in FIGS. 2 and 3. Bar 8 is placed in the frame 6 in a position such that the diagonal lines of its section very approximately coincide with the median lines of the section of the frame 6. Thus, there are formed between the bar and the frame four spaces the section of which is approximately triangular, inside each one of which is disposed an elastic fitting 9 comprising a rubber block elongated in shape, and the general cross section of which is circular prior to its insertion and deformation. Bar 8 is, in that way, resiliently maintained inside frame 6.

Frame 6 is also connected to the chassis of the vehicle (which is partially shown at 10 in the figures), by means of a connecting arm 11 welded at one end on said frame and fastened, at the other end, to an elastic block 12 of rubber which is itself affixed to the chassis 10.

Bar 8 has ends that project slightly beyond the frame, the ends being fixed to arms 13 or 14, which connect the bar 8 to a tubular cross-bar 15. The latter is articulated at 16 and 17 on the chassis 10. In the present embodiment, each one of these articulations consists of a rod, screwed in bar 15 and disposed inside a calibrated tube disposed in the chassis element 10.

In the embodiment illustrated, an elastic block 12 is affixed to a vertical plate 10b of said chassis.

As shown in FIGS. 2 and 3, the various suspension members are positioned so that frame 6, the elastic block 12 and the points of connection to the chassis element 10a will form, in projection on a vertical plane, a triangulated system, which is deformable by the play resulting from the elasticity of block 12 and of fittings 9. The frame is located forward of block 12 and of the connecting points mentioned above, and at an intermediate height between the height of said block and that of said connecting points. Thus, wheel 1 suspended from the chassis through said triangulated deformable system can be subject to small displacements in its plane in all directions of the same. Freedom of play over 360° makes possible the passing of obstacles or of uneven areas, without any shock and without developing significant stresses in the chassis or in the body of the vehicle. Variable tightening of the bolts 7 makes it possible to adjust the stiffness of the suspension.

When starting, the wheel which is set into rotation is the seat of a traction force F at the point of contact with the ground, a force which determines the developing of a torque $C_1, C_2$, the tendency of which is to deform the triangulated system in the direction of a pivoting motion toward the upper part of support 5. The front part of the vehicle shows a tendency to move downward, an effect which compensates the well known rearing effect which develops on the vehicle. The opposite lowering effect on the front part of the vehicle, under braking action is also compensated by the opposite deformation of the triangulated system.

As already indicated, no rigid part of the suspended unit is in direct connection with the chassis or with the body; that unit is completely insulated so that the transmission of the vibrations coming from the motor as well as those coming from the rolling members is appreciably reduced.

The suspension system according to the present invention has a simple structure, made of conventional parts, a feature which makes it possible to manufacture it in limited quantities at low cost. Moreover, it required no particular upkeep.

It is evident that the present invention is not limited to the terms of the preceding description, but also encompasses all of its variations.

The invention is hereby claimed as follows:

1. A suspension system for connecting an axle support for a wheel of a vehicle to the chassis of the vehicle comprising:
   a. a hollow cross frame containing a bar maintained in said frame by means of elastic fittings;
   b. a support for an axle to carry a wheel, said support being fixed to said hollow cross frame;
   c. at least one connecting arm connecting said hollow cross frame to the chassis of the vehicle through an elastic block;
   d. at least one connecting arm connecting said bar to the chassis of the vehicle through articulation means; said hollow cross frame being disposed at an intermediate height between the height of the elastic bar and the height of said articulation means, thereby to form, in projection on a vertical plane, a deformable triangulated suspension system.

2. A suspension system as claimed in claim 1 wherein two connecting arms are connected to said bar, said arms being fastened to opposing ends of said bar on each side of said cross frame.

3. A suspension system as claimed in claim 1 wherein said axle support is a support of a front axle on which is mounted a front wheel of a vehicle which is located forwardly of said cross frame and said deformable triangulated system.

4. a suspension system as claimed in claim 1 wherein said hollow cross frame consists of two opposing half shells connected together by means for adjusting the spacing between said shells.

5. A suspension system as claimed in claim 1 wherein said cross frame is composed of two opposing half shells formed by U-shaped metal profiles, said bar is approximately square in cross section and is placed in said frame in a position such that the diagonals approximately coincide with the medians of the frame in cross section, and the elastic fittings are four in number each consisting of an elongated elastic block located in one of the four triangular spaces formed between the bar and the inside of the frame.

* * * * *